US011731625B2

(12) United States Patent
Takahama

(10) Patent No.: US 11,731,625 B2
(45) Date of Patent: Aug. 22, 2023

(54) VEHICLE CONTROL APPARATUS AND METHOD FOR CONTROLLING THE SAME, AND VEHICLE CONTROL SYSTEM

(71) Applicant: Hitachi Automotive Systems, Ltd., Hitachinaka (JP)

(72) Inventor: Taku Takahama, Yokohama (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 54 days.

(21) Appl. No.: 16/961,743

(22) PCT Filed: Jan. 7, 2019

(86) PCT No.: PCT/JP2019/000067
§ 371 (c)(1),
(2) Date: Jul. 13, 2020

(87) PCT Pub. No.: WO2019/150884
PCT Pub. Date: Aug. 8, 2019

(65) Prior Publication Data
US 2021/0061275 A1 Mar. 4, 2021

(30) Foreign Application Priority Data

Feb. 2, 2018 (JP) ................................. 2018-017582

(51) Int. Cl.
*B60W 30/165* (2020.01)
*B60W 10/20* (2006.01)
(Continued)

(52) U.S. Cl.
CPC .......... *B60W 30/165* (2013.01); *B60W 10/20* (2013.01); *G05D 1/0223* (2013.01);
(Continued)

(58) Field of Classification Search
CPC ............... B60W 30/165; B60W 10/20; B60W 2520/10; B60W 2556/10;
(Continued)

(56) References Cited

U.S. PATENT DOCUMENTS

2004/0030498 A1\* 2/2004 Knoop ..................... B62D 6/00
340/436
2017/0066444 A1\* 3/2017 Habu ................... G05D 1/0246
(Continued)

FOREIGN PATENT DOCUMENTS

CN 110177729 A \* 8/2019 ............ B60W 10/20
EP 3822138 A1 \* 5/2021 ............ B60W 10/04
(Continued)

OTHER PUBLICATIONS

JP2016206976.translate (Year: 2016).\*
JP2017065473.translate (Year: 2017).\*
International Search Report (PCT/ISA/210) issued in PCT Application No. PCT/JP2019/000067 dated Mar. 12, 2019 with English translation (five (5) pages).
(Continued)

*Primary Examiner* — B M M Hannan
(74) *Attorney, Agent, or Firm* — Crowell & Moring LLP

(57) ABSTRACT

A vehicle control apparatus calculates an approximation equation of an N-th degree function as a movement trajectory of a preceding vehicle from at least two pieces of relative position information. The vehicle control apparatus also calculates a coefficient of a predetermined degree in each approximation equation, and in the calculation of the coefficient of the predetermined degree and uses an approximation equation calculated from the at least two pieces of relative position information acquired when setting a retrospective range to the same range or a narrower range compared to when calculating a coefficient of a relatively low degree when calculating a coefficient of a relatively high
(Continued)

degree. The vehicle control apparatus also uses an approximation equation when setting the retrospective range to a narrower range compared to when calculating a coefficient of a lowest degree at least when calculating a coefficient of a highest degree.

6 Claims, 9 Drawing Sheets

(51) Int. Cl.
    *G05D 1/02*     (2020.01)
    *G06F 17/17*     (2006.01)

(52) U.S. Cl.
    CPC ......... *G06F 17/17* (2013.01); *B60W 2520/10* (2013.01); *B60W 2556/10* (2020.02)

(58) Field of Classification Search
    CPC ..... B60W 60/00272; B60W 2554/801; B60W 2554/802; B60W 30/10; G05D 1/0223; G06F 17/17; B62D 6/00
    USPC .......................................................... 701/25
    See application file for complete search history.

(56) References Cited

U.S. PATENT DOCUMENTS

| | | | | |
|---|---|---|---|---|
| 2018/0201241 A1* | 7/2018 | Takae | ................... | B60T 8/4827 |
| 2018/0339728 A1* | 11/2018 | Hamada | ............... | B62D 15/025 |
| 2019/0193739 A1* | 6/2019 | Tokimasa | .............. | B60W 40/04 |

FOREIGN PATENT DOCUMENTS

| | | | | | |
|---|---|---|---|---|---|
| JP | 2004130964 A | * | 4/2004 | ............. | B60T 8/172 |
| JP | 2004130965 A | * | 4/2004 | ............. | B60T 8/172 |
| JP | 2017-65473 A | | 4/2017 | | |
| JP | 2017065473 A | * | 4/2017 | | |
| JP | 2017076234 A | * | 4/2017 | | |
| WO | WO-2017017764 A1 | * | 2/2017 | ........... | B60T 13/662 |

OTHER PUBLICATIONS

Japanese-language Written Opinion (PCT/ISA/237) issued in PCT Application No. PCT/JP2019/000067 dated Mar. 12, 2019 with English translation (nine (9) pages).

\* cited by examiner

VEHICLE CONTROL APPARATUS AND METHOD FOR CONTROLLING THE SAME, AND VEHICLE CONTROL SYSTEM

TECHNICAL FIELD

The present invention relates to a vehicle control apparatus and a method for controlling it, and a vehicle control system that perform control of causing a subject vehicle to run while following a preceding vehicle ahead thereof.

BACKGROUND ART

There has been known a conventional vehicle such as an automobile that has performed control of estimating the movement trajectory of a preceding vehicle moving ahead of a subject vehicle and causing the subject vehicle to follow the preceding vehicle based on this estimated movement trajectory as disclosed in, for example, PTL 1.

The vehicle registers the position of the preceding vehicle relative to the subject vehicle sequentially and estimates the movement trajectory from the registered plurality of relative positions in this estimation of the movement trajectory of the preceding vehicle, and adjusts the cycle for registering the relative position of the preceding vehicle according to the vehicle speed of the subject vehicle and the inter-vehicular distance between the subject vehicle and the preceding vehicle. By this adjustment, the vehicle estimates the movement trajectory of the preceding vehicle with improved accuracy while keeping the memory into which the relative position of the preceding vehicle is buffered from exceeding the predetermined capacity.

CITATION LIST

Patent Literature

[PTL 1] Japanese Patent Application Public Disclosure No. 2017-065473

SUMMARY OF INVENTION

Technical Problem

However, even after adjusting the cycle for registering the relative position of the preceding vehicle according to the vehicle speed and the distance between the vehicles, the vehicle has difficulty in satisfying both the accuracy and the responsiveness for the estimation of the movement trajectory if using an inappropriate range among the registered plurality of relative positions when estimating the movement trajectory of the preceding vehicle. For example, when estimating the lateral position of the subject vehicle relative to the movement trajectory of the preceding vehicle, if estimating the movement trajectory in a range suitable for ensuring the accuracy for estimating the lateral position of the subject vehicle among the registered plurality of relative positions, the vehicle may end up estimating the curvature with insufficient responsiveness.

An object of the present invention is to provide a vehicle control apparatus and a method for controlling it, and a vehicle control system that improve the compatibility between the accuracy and the responsiveness for the estimation of the movement trajectory of the preceding vehicle.

Solution to Problem

According to one aspect of the present invention, a vehicle control apparatus receives a plurality of pieces of relative position information acquired at different timings by an external world recognition apparatus and each indicating a position of a preceding vehicle relative to a subject vehicle. The preceding vehicle is a target that the subject vehicle follows ahead thereof. The vehicle control apparatus stores the received plurality of pieces of relative position information. The vehicle control apparatus calculates an approximation equation of an N-th degree function (N is an integer equal to or greater than one in this case) as a movement trajectory of the preceding vehicle from at least two pieces of relative position information in each of a plurality of retrospective ranges set as ranges to which the vehicle control apparatus should date back from newest relative position information in a history of the stored plurality of pieces of relative position information, and calculates a coefficient of a predetermined degree in each approximation equation. In the calculation of the coefficient of the predetermined degree, the vehicle control apparatus uses an approximation equation calculated from the at least two pieces of relative position information acquired when setting the retrospective range to the same range or a narrower range compared to when calculating a coefficient of a relatively low degree when calculating a coefficient of a relatively high degree, and uses an approximation equation calculated from the at least two pieces of relative position information acquired when setting the retrospective range to a narrower range compared to when calculating a coefficient of a lowest degree at least when calculating a coefficient of a highest degree. The vehicle control apparatus outputs an instruction according to the calculated coefficient of each degree to a steering control apparatus of the subject vehicle.

According to the one aspect of the present invention, it is possible to improve the compatibility between the accuracy and the responsiveness for the estimation of the movement trajectory of the preceding vehicle.

DESCRIPTION OF EMBODIMENTS

Figure 1:
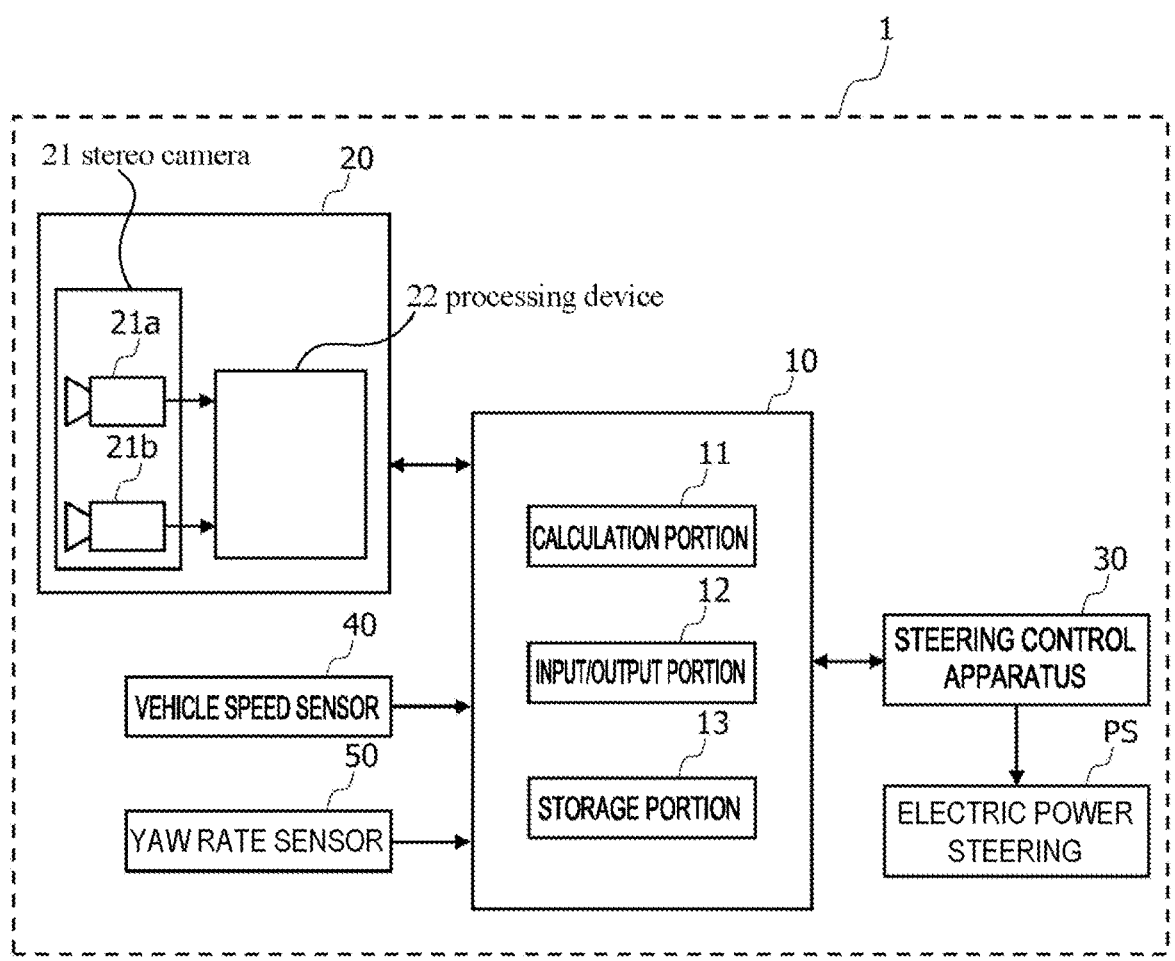
FIG. 1 schematically illustrates a configuration indicating one example of a driving assist system.

In the following description, an embodiment for implementing the present invention will be described in detail with reference to the accompanying drawings. FIG. 1 illustrates one example of a driving assist system mounted on a vehicle. The driving assist system is an in-vehicle control system for performing adaptive cruise control of causing a vehicle (a vehicle on which this driving assist system itself is mounted, which will be hereinafter referred to as a subject vehicle) 1, such as an automobile, to run while following a preceding vehicle running ahead thereof. The driving assist system includes an external world recognition apparatus 20 in addition to a driving assist control apparatus (a vehicle control apparatus) 10, which constitutes a main configuration of the driving assist system. The driving assist control apparatus 10 is communicably connected to a steering control apparatus 30, which controls an electric power steering PS mounted on the subject vehicle, in addition to the external world recognition apparatus 20. First, the external world recognition apparatus 20 and the steering control apparatus 30 will be described.

The external world recognition apparatus 20 is an external world recognition portion in the driving assist system, which recognizes the external environment surrounding the subject vehicle with use of an external world detector (device), such as a monocular camera or a stereo camera, and a millimeter-wave radar or a laser radar. In the following description, the external world recognition apparatus 20 will be described referring to an example equipped with a stereo camera 21 including two cameras 21a and 21b and an image processing device 22 including an image processing LSI (Large Scale Integration) that performs image processing on an image captured by the stereo camera 21.

In the stereo camera 21, the two cameras 21a and 21b image an object lying ahead of the subject vehicle 1 from different directions in synchronization with each other. The two cameras 21a and 21b are disposed so as to be spaced apart from each other by a predetermined baseline length in the vehicle width direction, i.e., the lateral direction, near, for example, the windshield in the vehicle compartment. Further, the two cameras 21a and 21b each include an image sensor such as a CCD (Charge Coupled Device) or a CMOS (Complementary Metal Oxide Semiconductor), and a lens spaced apart therefrom by a predetermined focal distance. Then, the two cameras 21a and 21b each convert light incident on the image sensor from the object via the lens into an electric signal according to intensity thereof, thereby outputting image data of the imaged object to the image processing device 22.

The image processing device 22 performs image matching processing on the pair of lateral images of the object that are captured by the stereo camera 21, thereby calculating a pixel misalignment amount (a parallax) between corresponding positions in the pair of lateral images and generating a distance image in which each point indicates a distribution of distance information based on, for example, a luminance or the like according to the parallax. Then, the image processing device 22 converts a point in the distance image into coordinates in a three-dimensional real space in which the X axis is set on the vehicle length direction, i.e., the distance direction, the Y axis is set on the vehicle width direction, i.e., the lateral direction, and the Z axis is set on the vehicle height direction by using the baseline length and the focal distance of the two cameras 21a and 21b and the triangulation principle. As a result, the external world recognition apparatus 20 recognizes the relative positional relationship between the imaging object, such as a lane marking of the road on which the subject vehicle 1 runs (the centerline of the traffic lane, the outer line of the traffic lane, and the like), an obstacle, and a preceding vehicle moving ahead of the subject vehicle 1, and the subject vehicle 1.

Especially, the image processing device 22 converts a specific point in the distance image that is located in a back-side region of the preceding vehicle moving ahead of the subject vehicle 1 into XY coordinates with the origin placed on the subject vehicle 1, and sets the converted XY coordinate values as relative position information of the preceding vehicle relative to the subject vehicle 1. For example, the central position in the vehicle width direction in the back-side region of the preceding vehicle in the distance image can be employed as the specific point. The central point of the subject vehicle 1, i.e., a point at which the central line of the subject vehicle 1 in the vehicle width direction and the central line of the subject vehicle 1 in the vehicle length direction overlap each other can be employed as the origin of the XY coordinates. Then, the image processing device 22 outputs a signal corresponding to the relative position information to the driving assist control apparatus 10.

The steering control apparatus 30 controls an assist torque to be generated by a motor (not illustrated) that drives the electric power steering PS provided in the steering system of the subject vehicle 1 based on vehicle information such as the vehicle speed of the subject vehicle 1, the steering torque input by the driver, and the steering angle to assist the driver's steering operation. Further, the steering control apparatus 30 sets a steering amount so as to follow the movement trajectory of the preceding vehicle moving ahead of the subject vehicle 1 and controls the driving of the motor of the electric power steering PS according to this steering amount, when performing adaptive cruise control according to an instruction signal from the driving assist control apparatus 10.

Next, the driving assist control apparatus 10 will be described. The driving assist control apparatus 10 includes a calculation portion 11, such as a CPU (Central Processing Unit) and an MPU (Micro Processing Unit), an input/output portion 12, which is an input/output interface of a signal with an external apparatus, a storage portion 13, which stores various kinds of information therein, and the like. Further, the driving assist control apparatus 10 inputs the signal corresponding to the relative position information from the image processing apparatus 22 via the input/output portion 12. Further, the driving assist control apparatus 10 is connected to a vehicle speed sensor 4, which detects a vehicle speed V of the subject vehicle 1, and a yaw rate sensor 50, which detects a yaw rate γ of the subject vehicle 1, and inputs signals corresponding to the vehicle speed V and the yaw rate γ via the input/output portion 12.

The calculation portion 11 reads out and executes a control program stored in a ROM (Read Only Memory) of the storage portion 13 or the like, by which the driving assist control apparatus 10 performs the adaptive cruise control of causing the subject vehicle 1 to run while following the preceding vehicle ahead thereof based on the vehicle speed V, the yaw rate γ, and the relative position information.

More specifically, the calculation portion 11 detects the position of the preceding vehicle relative to the subject vehicle 1 based on the relative position information per calculation cycle. The position of the preceding vehicle relative to the subject vehicle 1 contains an X coordinate value, which is a component in the vehicle length direction of the subject vehicle 1 and will be referred to as a longitudinal position, and a Y coordinate value, which is a component in the vehicle width direction of the subject vehicle 1 and will be referred to as a lateral position. The position of the preceding vehicle relative to the subject vehicle 1, which is detected by the calculation portion 11, is sequentially stored into the storage portion 13 such as a writable RAM (Random Access Memory), and is used as a registered relative position thereby.

Figure 2:
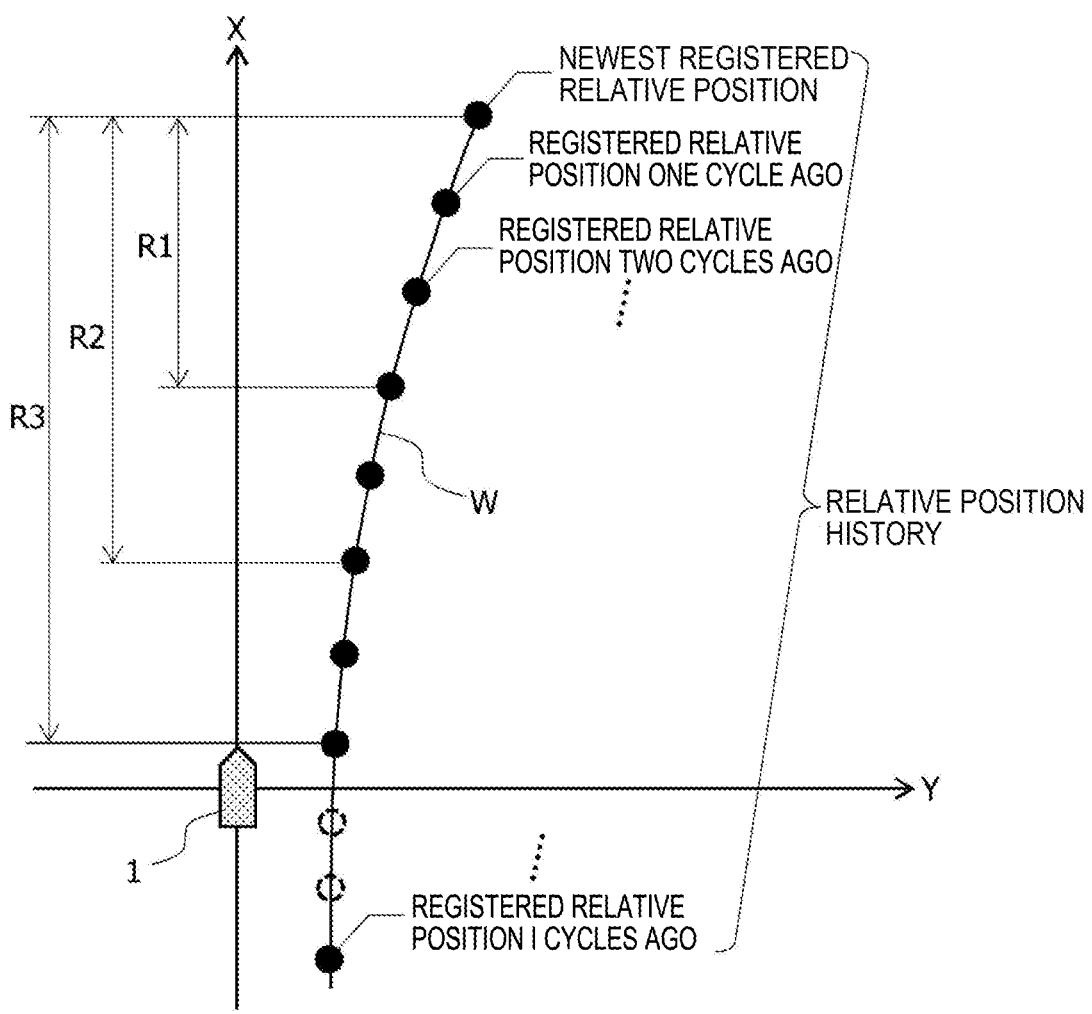
FIG. 2 illustrates a relative position history including a plurality of registered relative positions.

FIG. 2 illustrates a relative position history including a plurality of registered relative positions. The calculation portion 11 estimates a movement trajectory W of the preceding vehicle based on a plurality of registered relative positions stored in the storage portion 13. Then, the calculation portion 11 controls the driving of the motor (not illustrated) of the electric power steering PS via the steering control apparatus 30 in such a manner that the position of the subject vehicle 1 matches the estimated movement trajectory of the preceding vehicle. For this purpose, the calculation portion 11 calculates a control parameter relating to a setting of a target steering angle of the electric power steering PS, and outputs an instruction signal corresponding thereto to the steering control apparatus 30.

The movement trajectory W of the preceding vehicle can be estimated with use of an approximation equation of an N-th degree function (N is an integer equal to or larger than 1) that the calculation portion 11 calculates by applying the least square method to the plurality of registered relative positions in the relative position history. The least square method is a method that determines such a coefficient that an error sum of squares is minimized in such a manner that the plurality of registered relative positions is excellently approximated by the approximation equation of the N-th degree function. Then, the control parameter relating to the setting of the target steering angle can be determined by identifying a coefficient of each degree in the approximation equation of the N-th degree function.

For example, in a case where the calculation portion 11 estimates the movement trajectory W of the preceding vehicle with use of an approximation equation of a quadric function, the control parameter relating to the setting of the target steering angle can be determined by identifying respective coefficients of the zeroth degree to the second degree in the approximation equation of the quadric function. In this case, the quadric coefficient indicates a curvature component of the movement trajectory W, the linear coefficient indicates a yaw angle component of the movement trajectory W (an inclination component of the movement trajectory relative to the subject vehicle), and the free term indicates a lateral position component of the movement trajectory W relative to the subject vehicle 1. Hereinafter, the movement trajectory W of the preceding vehicle will be assumed to be estimated with use of the approximation equation of the quadratic function for the convenience of the description.

Conventionally, the three control parameters, the curvature component, the yaw angle component, and the lateral position component have been determined by identifying the coefficient of each degree in an approximation equation of one quadratic function. However, when the least square method is applied to an inappropriate range of registered relative positions in the relative position history, this may make it difficult to satisfy both the accuracy and the responsiveness for the estimation of the movement trajectory W of the preceding vehicle.

For example, suppose that the range of registered relative positions in the relative position history to which the least square method is applied is set to a range R3 illustrated in FIG. 2 so as to make the estimation less susceptible to the influence of an error in the measurement of the lateral position in the actual movement trajectory W, when the movement trajectory W of the preceding vehicle is estimated with use of the approximation equation of the quadratic function. When the approximation equation of the quadratic function is calculated with the range R3 set as the range of registered relative positions to which the least square method is applied in this manner, the approximation is calculated in the range R3 in which a small change in the lateral position is less reflective. Then, because the yaw angle is a value based on the time derivative of the lateral position, this calculation makes it difficult to reflect the information about the yaw angle in the actual movement trajectory W, thereby reducing the approximation accuracy. Similarly, because the curvature is a value based on the time derivative of the yaw angle, the calculation in the range R3 makes the information about the curvature in the actual movement trajectory W further less reflective on the approximated curve than the information about the yaw angle.

Therefore, the following measure should be taken to allow the information about the yaw angle to be reflected on the approximated curve with accuracy equivalent to the lateral position in the actual movement trajectory W. That is, as illustrated in FIG. 2, the least square method should be applied to a plurality of registered relative positions in a range R2 narrower than the range R3 of registered relative positions that is used in the calculation of the lateral position in the relative position history of the preceding vehicle. Similarly, the least square method should be applied to a plurality of registered relative positions in a range R1 further narrower than the range R2 used in the calculation of the yaw angle in the relative position history of the preceding vehicle to allow the information about the curvature to be reflected on the approximated curve with accuracy equivalent to the lateral position in the actual movement trajectory W.

Therefore, the calculation portion 11 of the driving assist control apparatus 10 calculates the approximation equation of the quadratic function individually for each calculation of the control parameter to calculate the three control parameters in the state that the information about the lateral position, the yaw angle, and the curvature in the actual movement trajectory W are appropriately reflected on the approximated curve.

Figure 3:
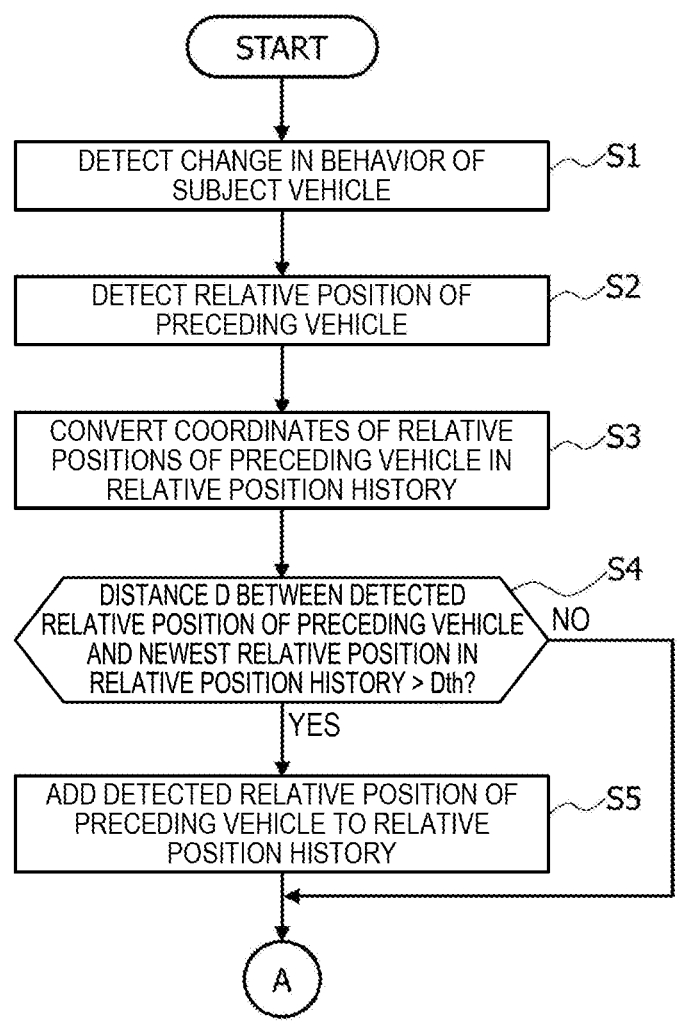
FIG. 3 is a flowchart illustrating processing for calculating a control parameter relating to a target steering angle.
Figure 4:
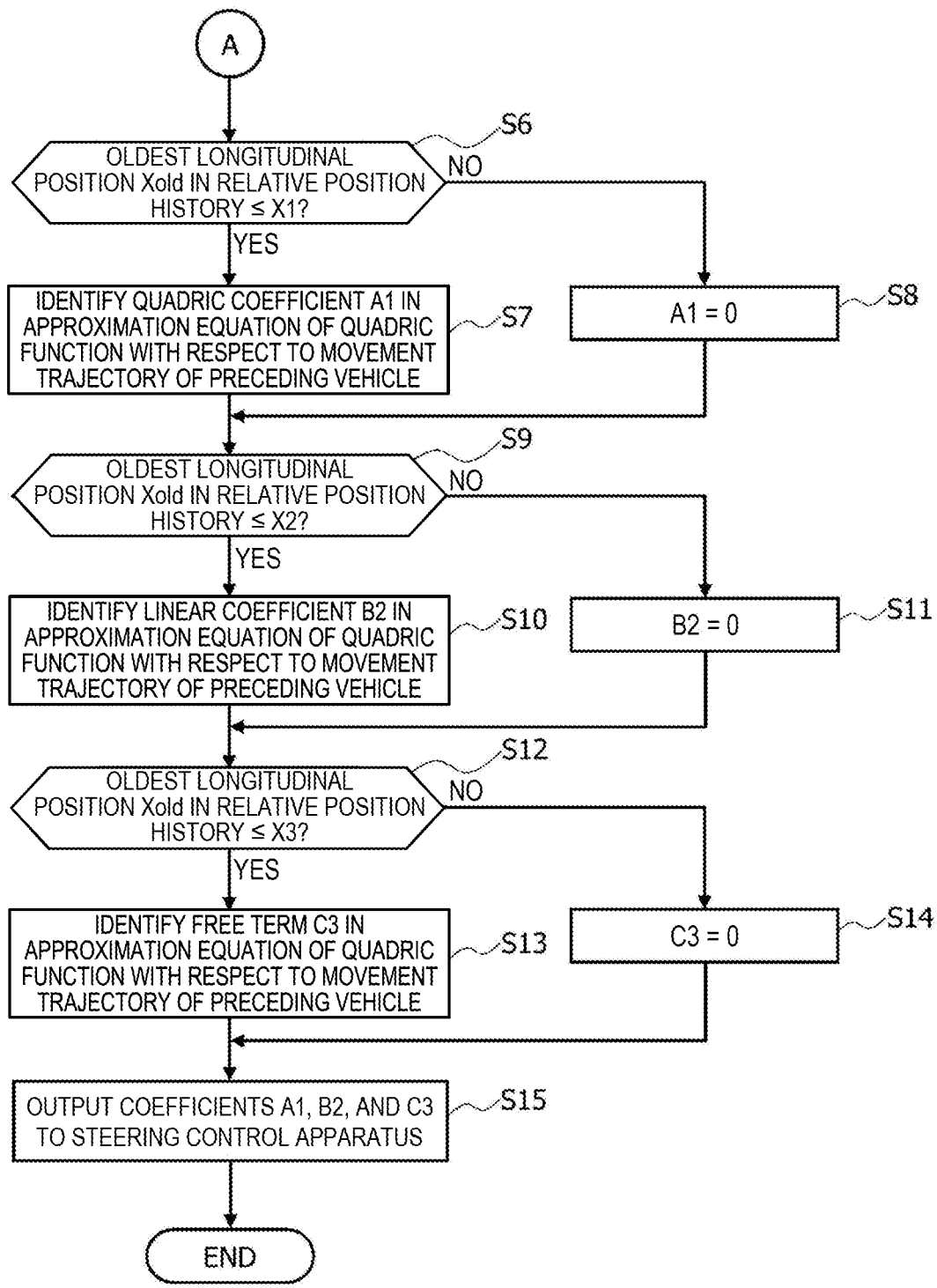
FIG. 4 is a flowchart illustrating the processing for calculating the control parameter relating to the target steering angle.

FIGS. 3 and 4 illustrate processing for calculating the control parameter relating to the target steering angle that is performed repeatedly per calculation cycle Ts by the calculation portion 11 of the driving assist control apparatus 10, after being triggered by the start of electric power supply to the driving assist control apparatus 10 according to an operation of turning on the ignition switch.

Figure 5:
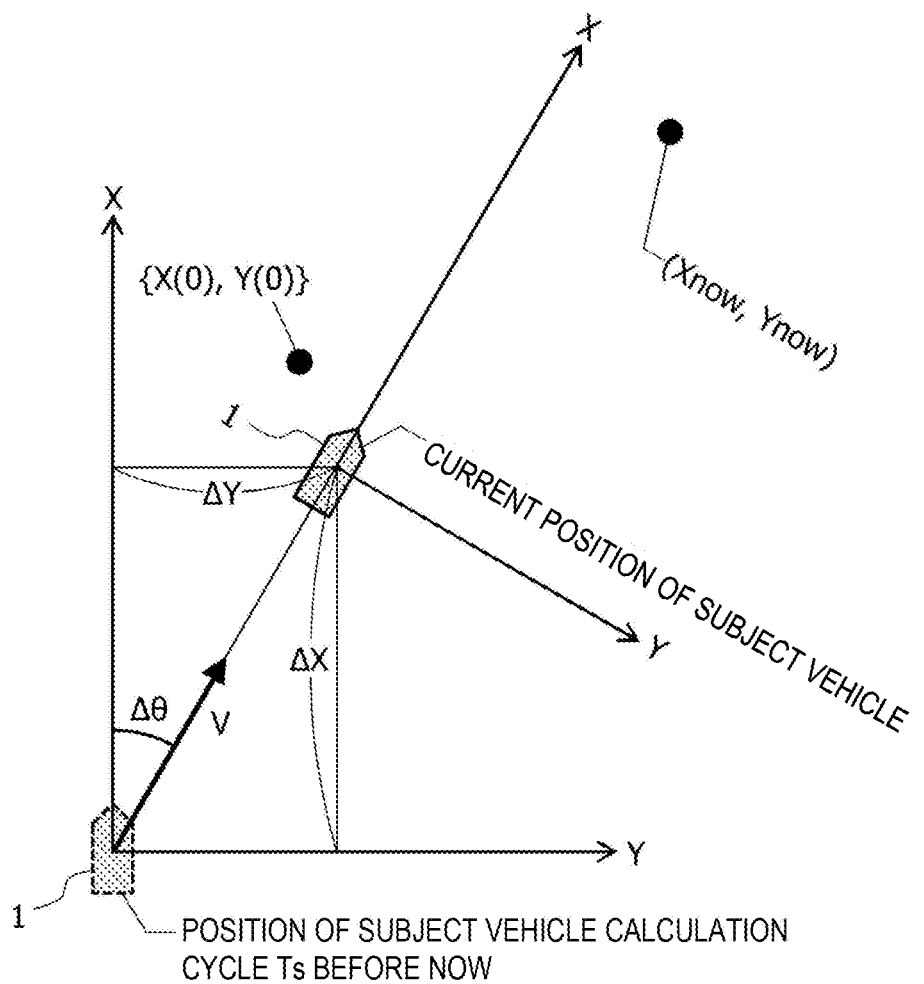
FIG. 5 illustrates rotational and translational change amounts of a subject vehicle.

In step S1 (which is abbreviated as "S1" in the drawings, and the same also applies to the following steps), the calculation portion 11 detects a change in the behavior of the subject vehicle 1 that might occur during a period starting one calculation cycle Ts before now and lasting until now. More specifically, the calculation portion 11 reads in the vehicle speed V from the vehicle speed sensor 40 and the yaw rate γ from the yaw rate sensor 50, and calculates rotational and translational change amounts of the subject vehicle 1. Now, FIG. 5 illustrates the rotational and translational change amounts of the subject vehicle 1 that are generated during the period starting one calculation cycle Ts before now and lasting until now. Assuming that Δθ, ΔX, and ΔY represent a rotational change amount of the subject vehicle 1, a translational change amount of the subject vehicle 1 in the vehicle length direction, and a translational change amount of the subject vehicle 1 in the vehicle width direction, respectively, as illustrated in FIG. 5, Δθ, ΔX, and ΔY are expressed by the following equations.

$$\Delta\theta = \gamma \times Ts \quad \Delta X = V \times Ts \times \cos\Delta\theta \quad \Delta Y = V \times Ts \times \sin\Delta\theta$$

In step S2, the calculation portion 11 detects the position of the preceding vehicle relative to the current subject vehicle 1 based on the relative position information from the image processing device 22. Assume that Xnow and Ynow represent the longitudinal position and the lateral position of the detected relative position, respectively. As illustrated in FIG. 5, the detected relative position (Xnow, Ynow) is expressed by the XY coordinates with the origin placed at the current position of the subject vehicle 1.

In step S3, the calculation portion 11 overwrites all of the registered relative positions in the relative position history stored in the storage portion 13 by converting them into XY coordinates with the origin placed at the current position of the subject vehicle 1 according to the rotational and translational change amounts calculated in step S1 to estimate the movement trajectory of the preceding vehicle. Assuming that X(I) and Y(I) represent the longitudinal position and the lateral position of the registered relative position in the relative position history, respectively, the registered relative position $\{X(I), Y(I)\}$ after the conversion into the coordinates is expressed by the left sides in the following equations. In the following equations, I represents an integer equal to or larger than zero that indicates time points at which the plurality of registered relative positions is stored in the reverse chronological order, and increments by one as the storage time point of the registered relative position is dating back with I=0 set as the storage time point of the newest registered relative position.

$$X(I)=\{X(I)-\Delta X\}\times\cos(-\Delta\theta)-\{Y(I)-\Delta Y\}\times\sin(-\Delta\theta)Y(I)=\{X(I)-\Delta X\}\times\sin(-\Delta\theta)+\{Y(I)-\Delta Y\}\times\cos(-\Delta\theta)$$

For example, in FIG. 5, the newest registered relative position $\{X(0), Y(0)\}$ in the relative position history is expressed by the XY coordinates with the origin placed at the position of the subject vehicle 1 one calculation cycle Ts before now. Therefore, the newest registered relative position $\{X(0), Y(0)\}$ in the relative position history is converted so as to be expressed by the XY coordinates with the origin placed at the current position of the subject vehicle 1 according to the above-described equations.

In step S4, the calculation portion 11 determines whether a distance D(>0) between the relative position (Xnow, Ynow) detected in step S2 and the newest registered relative position $\{X(0), Y(0)\}$ in the relative position history as a result of the coordinate conversion of the registered relative position in step S3 satisfies the following equation with respect to a threshold value Dth(>0).

$$D=[\{X(0)-Xnow\}2+\{Y(0)-Ynow\}2]^{1/2}>Dth$$

The magnitude relationship between the distance D and the threshold value Dth is determined in step S4 for the following reason. That is, the approximation equation of the quadratic function is little changed even when the movement trajectory of the preceding vehicle is estimated after the detected relative position (Xnow, Ynow) is added to the relative position history, when the position of the preceding vehicle relative to the subject vehicle 1 is little changed. For this reason, the calculation portion 11 determines that the memory resources in the storage portion 13 may be wasted if the distance D is equal to or shorter than the threshold value Dth, and refrains from storing the detected relative position (Xnow, Ynow) into the storage portion 13. Therefore, the threshold value Dth is appropriately set in consideration of the memory capacity of the RAM of the storage portion 13 or the like and the processing capability of the calculation portion 11.

If the calculation portion 11 determines that the distance D is longer than the threshold value Dth in step S4 (YES), the processing proceeds to step S5. On the other hand, if the calculation portion 11 determines that the distance D is equal to or shorter than the threshold value Dth in step S4 (NO), the processing proceeds to step S6 while skipping step S5.

In step S5, the calculation portion 11 stores the relative position (Xnow, Ynow) detected in step S2 into the storage portion 13 such as the writable RAM, thereby adding this relative position to the relative position history as a new registered relative position. More specifically, the calculation portion 11 overwrites the newest registered relative position $\{X(0), Y(0)\}$ in the relative position history as indicated by the following equations.

$$X(0)=Xnow\ Y(0)=Ynow$$

Then, the calculation portion 11 overwrites the remaining registered relative position(s) (I>0) in the relative position history in the storage portion 13 as indicated by the following equations. In this case, the left sides and the right sides in the following equations indicate the registered relative position after the overwriting and the registered relative position before the overwriting, respectively.

$$X(I+1)=X(I)Y(I+1)=Y(I)$$

However, the registered relative position can be kept stored in the RAM of the storage portion 13 or the like until I in the registered relative position $\{X(I), Y(I)\}$ reaches Imax (a positive integer). Therefore, when the oldest registered relative position (Xold, Yold) in the relative position history before the overwriting is $\{X(Imax), Y(Imax)\}$, (Xold, Yold) is deleted. The calculation portion 11 deletes the registered relative position stored in the RAM of the storage portion 13 or the like when determining that the adaptive cruise control cannot be performed, such as when the preceding vehicle, which is the target that the subject vehicle 1 follows ahead thereof, cannot be recognized by the external world recognition apparatus 20.

In step S6, the calculation portion 11 determines whether the longitudinal position Xold of the oldest registered relative position in the relative position history is equal to or smaller than a predetermined value X1. The predetermined value X1 is a threshold value (for example, 0 [m]) that defines the range R1 of registered relative positions to which the least square method will be applied when the approximation equation of the quadratic function for determining the control parameter of the curvature component is calculated in a step that will be described below. Then, if the calculation portion 11 determines that the longitudinal position Xold is equal to or smaller than the predetermined value X1 (YES, the processing proceeds to step S7. On the other hand, if the calculation portion 11 determines that the longitudinal position Xold is greater than the predetermined value X1 (NO), the processing proceeds to step S8.

In step S7, the calculation portion 11 calculates the approximation equation of the quadratic function Y=F1(X) by applying the least square method to the registered relative positions in the relative position history that fall within the predetermined range. The range R1 of registered relative positions to which the least square method is applied is a range from the newest registered relative position $\{X(0), Y(0)\}$ in the relative position history to the registered relative position having the longitudinal position Xold exceeding the predetermined value X1 among the registered relative positions $\{X(I), Y(I)\}$ in the relative position history. The approximation equation of the quadratic function Y=F1(X) is expressed by the following equation using a quadratic coefficient A1, a linear coefficient B1, and a free term C1.

$$Y=F1(X)=A1\times X^2+B1\times X+C1$$

Then, the calculation portion 11 calculates the curvature (1/R) of the movement trajectory of the preceding vehicle that corresponds to the current longitudinal position of the subject vehicle 1, i.e., X=0 from the approximation equation of the quadratic function Y=F1(X) as the control parameter of the curvature component. The curvature (1/R) of the movement trajectory corresponding to X=0 can be acquired with use of derivative functions acquired by calculating a second-order derivative and a first-order derivative of the approximation equation of the quadratic function Y=F1(X) with respect to X as indicated by the following equation.

$$1/R = F1''(0)/(1+F1'(0)2)3/2 = 2 \times A1/(1+B12)3/2$$

The linear coefficient B1 is a value close to zero in the above equation, and therefore the curvature (1/R) can be calculated from an equation 1/R=2×A1. Therefore, the calculation portion 11 identifies the quadratic coefficient A1 in the approximation equation of the quadratic function Y=F1(X) as the control parameter of the curvature component and stores it into the RAM of the storage portion 13 or the like. Then, the processing proceeds to step S9.

In step S8, the calculation portion 11 sets the quadratic coefficient A1 as the control parameter of the curvature component to zero and stores it into the RAM of the storage portion 13 or the like. Then, the processing proceeds to step S9.

In step S9, the calculation portion 11 determines whether the longitudinal position Xold of the oldest registered relative position in the relative position history is equal to or smaller than a predetermined value X2. The predetermined value X2 is a threshold value that defines the range R2 of registered relative positions to which the least square method will be applied when the approximation equation of the quadratic function for determining the control parameter of the yaw angle component is calculated in a step that will be described below. Further, the predetermined value X2 is a value smaller than the above-described predetermined value X1 (for example, −15 [m]). Therefore, the range R1 of registered relative positions to which the least square method is applied at the time of the calculation of the approximation equation of the quadratic function for determining the control parameter of the curvature component as described above is narrower than the range R2 of registered relative positions when the control parameter of the yaw angle component is determined.

If the calculation portion 11 determines that the longitudinal position Xold is equal to or smaller than the predetermined value X2 in step S9 (YES), the processing proceeds to step S10. On the other hand, if the calculation portion 11 determines that the longitudinal position Xold is greater than the predetermined value X2 in step S9 (NO), the processing proceeds to step S11.

In step S10, the calculation portion 11 calculates the approximation equation of the quadratic function Y=F2(X) by applying the least square method to the registered relative positions in the relative position history that fall within the predetermined range. The range R2 of registered relative positions to which the least square method is applied is a range from the newest registered relative position {X(0), Y(0)} in the relative position history to the registered relative position having the longitudinal position Xold exceeding the predetermined value X2 among the registered relative positions {X(I), Y(I)} in the relative position history. The approximation equation of the quadratic function Y=F2(X) is expressed by the following equation using a quadratic coefficient A2, a linear coefficient B2, and a free term C2.

$$Y = F2(X) = A2 \times X^2 + B2 \times X + C2$$

Then, the calculation portion 11 calculates the yaw angle ψ of the movement trajectory corresponding to the current longitudinal position of the subject vehicle 1, i.e., X=0 from the approximation equation of the quadratic function Y=F2(X) as the control parameter of the yaw angle component. The yaw angle ψ of the movement trajectory corresponding to X=0 can be acquired from a derivative function acquired by calculating a first-order derivative of the approximation equation of the quadratic function Y=F2(X) with respect to X as indicated by the following equation. Therefore, the calculation portion 11 identifies the linear coefficient B2 as the control parameter of the yaw angle component and stores it into the RAM of the storage portion 13 or the like. Then, the processing proceeds to step S12.

$$\psi = F2'(0) = B2$$

In step S11, the calculation portion 11 sets the linear coefficient B2 as the control parameter of the curvature component to zero and stores it into the RAM of the storage portion 13 or the like. Then, the processing proceeds to step S12.

In step S12, the calculation portion 11 determines whether the longitudinal position Xold of the oldest registered relative position in the relative position history is equal to or smaller than a predetermined value X3. The predetermined value X3 is a threshold value that defines the range R3 of registered relative positions to which the least square method will be applied when the approximation equation of the quadratic function for determining the control parameter of the lateral position component is calculated in a step that will be described below. Further, the predetermined value X3 is a value smaller than the above-described predetermined value X2 (for example, −30 [m]). Therefore, the range R2 of registered relative positions to which the least square method is applied at the time of the calculation of the approximation equation of the quadratic function for determining the control parameter of the yaw angle component as described above is narrower than the range R3 of registered relative positions when the control parameter of the lateral position component is determined.

If the calculation portion 11 determines that the longitudinal position Xold is equal to or smaller than the predetermined value X3 in step S12 (YES), the processing proceeds to step S13. On the other hand, if the calculation portion 11 determines that the longitudinal position Xold is greater than the predetermined value X3 in step S12 (NO), the processing proceeds to step S14.

In step S13, the calculation portion 11 calculates the approximation equation of the quadratic function Y=F3(X) by applying the least square method to the registered relative positions in the relative position history that fall within the predetermined range. The range R3 of registered relative positions to which the least square method is applied is a range from the newest registered relative position {X(0), Y(0)} in the relative position history to the registered relative position having the longitudinal position Xold exceeding the predetermined value X3 among the registered relative positions {X(I), Y(I)} in the relative position history. The approximation equation of the quadratic function Y=F3(X) is expressed by the following equation using a quadratic coefficient A3, a linear coefficient B3, and a free term C3.

$$Y = F3(X) = A3 \times X^2 + B3 \times X + C3$$

Then, the calculation portion 11 calculates the lateral position YX=0 of the movement trajectory corresponding to the current longitudinal position of the subject vehicle 1, i.e., X=0 from the approximation equation of the quadratic function Y=F3(X) as the control parameter of the lateral position component. The lateral position YX=0 of the movement trajectory corresponding to X=0 is determined to be the free term C3 as indicated by the following equation. Therefore, the calculation portion 11 identifies the free term C3 as the control parameter of the lateral position component and stores it into the RAM of the storage portion 13 or the like. Then, the processing proceeds to step S15.

$$YX=0=F3(0)=C3$$

In step S14, the calculation portion 11 sets the free term C3 as the control parameter of the curvature component to zero and stores it into the RAM of the storage portion 13 or the like. Then, the processing proceeds to step S15.

In step S15, the calculation portion 11 sets the quadratic coefficient A1, the linear coefficient B2, and the free term C3 stored in the RAM of the storage portion 13 or the like as the three control parameters relating to the target steering angle, and outputs an instruction signal corresponding to them to the steering control apparatus 30 via the input/output portion 12. The adaptive cruise control by the driving assist control apparatus 10 is achieved by performing the above-described steps S1 to S15. When all the quadratic coefficient A1, the linear coefficient B2, and the free term C3 are zero, the calculation portion 11 can determine that the adaptive cruise control cannot be performed. In this case, the steering control apparatus 30 controls the assist torque to be generated by the motor (not illustrated) that drives the electric power steering PS based on various kinds of vehicle information to assist the steering operation performed by the driver.

The steering control apparatus 30 calculates the target steering angle of the electric power steering PS based on the three control parameters of the curvature component, the yaw angle component, and the lateral position component. Then, the driving of the motor (not illustrated) of the electric power steering PS is controlled according to a target steering torque that realizes this target steering angle.

Figure 6A:
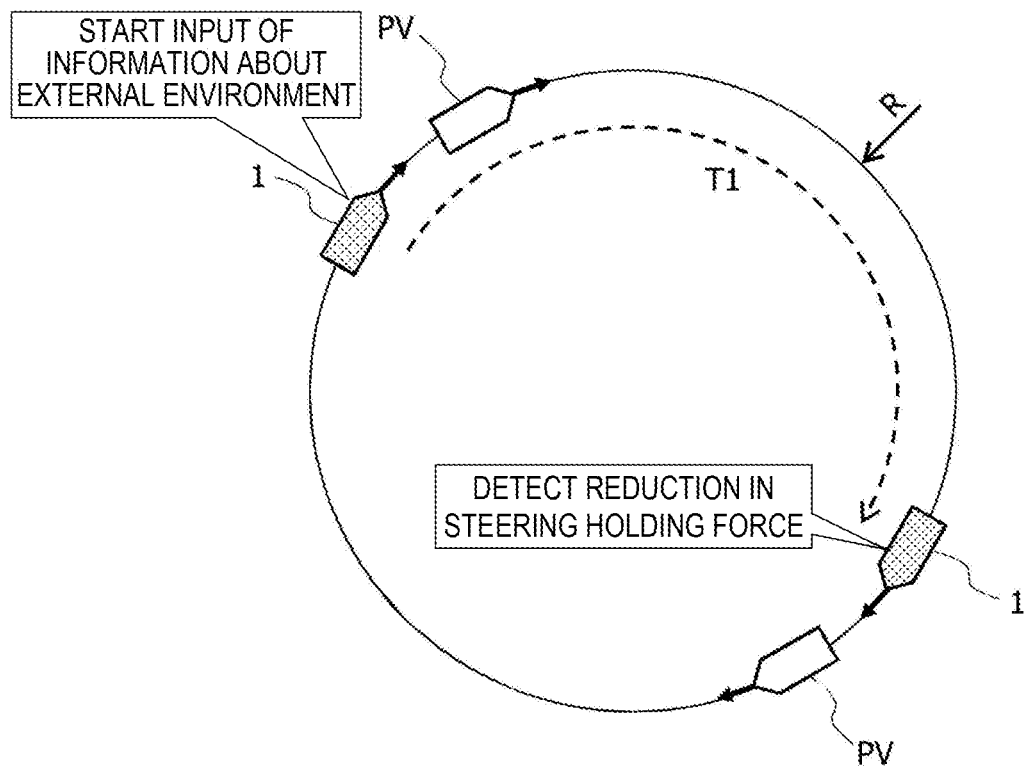
FIGS. 6A and 6B illustrate a method for confirming the execution of adaptive cruise control.
Figure 6B:
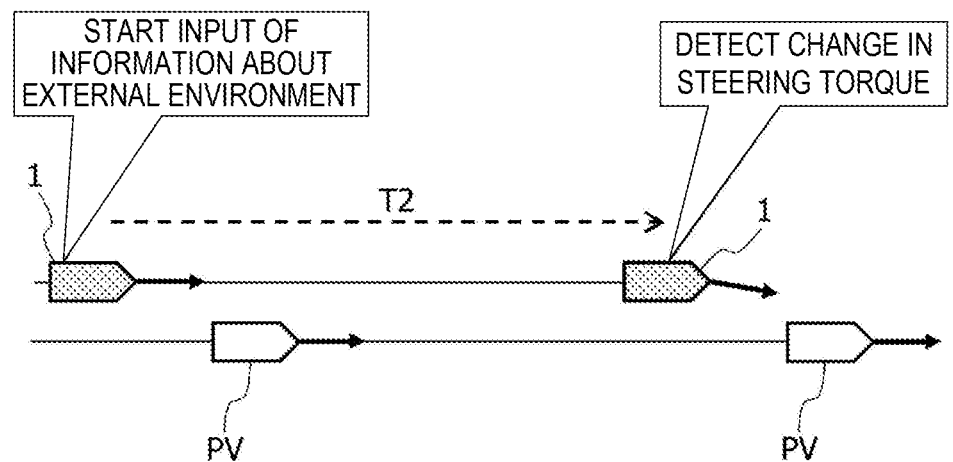

FIG. 6 illustrate one example of a method for confirming whether the adaptive cruise control by the driving assist control apparatus 10 is in operation. The present method observes a change in the torque working on the electric power steering PS between a running state 1, in which the control parameter of the curvature component is not set to zero but the control parameter of the lateral position component is set to zero (refer to FIG. 6(a)), and a running state 2, in which the control parameter of the lateral position component is not set to zero but the control parameter of the curvature component is set to zero (refer to FIG. 6(b)).

First, the observation of the torque in the running state 1 will be described. As illustrated in FIG. 6(a), a steady state circular test is conducted with a constant distance kept as the inter-vehicular distance between the subject vehicle 1 and the preceding vehicle PV moving ahead thereof on a road having a constant curvature (for example, the curvature radius R=500 [m]). At this time, the driver steers the vehicle in such a manner that the position of the subject vehicle 1 is located on the circular-arc movement trajectory of the preceding vehicle PV (the difference in the lateral position of the subject vehicle 1 from the movement trajectory matches zero). Further, the input of the information about the external environment to the external world recognition apparatus 20 of the subject vehicle 1 is blocked so that the storage portion 13 is kept in a state not storing the position of the preceding vehicle PV relative to the subject vehicle 1 at all. For example, in the case where the stereo camera 21 is used, the lenses of the cameras 21a and 21b are covered with extremely low light-transmissive shielding members, thereby prohibiting light from entering them. After that, the driver allows the information about the external environment to be input to the external world recognition apparatus 20 by, for example, removing the shielding members covering the lenses of the cameras 21a and 21b, and also starts the measurement of time. The driver ends the measurement of time when feeling that the steering holding force of the electric power steering PS reduces, and records the measurement time at this time as T1.

Next, the observation of the torque in the running state 2 will be described. As illustrated in FIG. 6(b), the driver causes the subject vehicle 1 to run straight at a vehicle speed equal to the preceding vehicle PV with the lateral position of the subject vehicle 1 offset from the preceding vehicle PV running straight on a straight road. At this time, the input of the information about the external environment to the external world recognition apparatus 20 of the subject vehicle 1 is blocked so that the storage portion 13 is kept in the state not storing the position of the preceding vehicle PV relative to the subject vehicle 1 at all. For example, in the case where the stereo camera 21 is used, the lenses of the cameras 21a and 21b are covered with extremely low light-transmissive shielding members, thereby prohibiting light from entering them. After that, the driver allows the information about the external environment to be input to the external world recognition apparatus 20 by, for example, removing the shielding members covering the lenses of the cameras 21a and 21b, and also starts the measurement of time. The driver ends the measurement of time when feeling a change in the steering torque that causes the lateral position of the subject vehicle 1 to match the movement trajectory of the preceding vehicle PV, and stores the measurement time at this time as T2.

The reduction in the steering holding force is detected in the running state 1 when the calculation portion 11 identifies the quadratic coefficient A1 as the curvature component from the approximation equation of the quadratic function Y=F(X) calculated by applying the least square method to the registered relative positions in the relative position history that fall within the range R1, and outputs it to the steering control apparatus 30 (refer to steps S7 and S15 in FIG. 4). On the other hand, the change in the steering torque is detected in the running state 2 when the calculation portion 11 identifies the free term C3 as the lateral position component from the approximation equation of the quadratic function Y=F(X) calculated by applying the least square method to the registered relative positions in the relative position history that fall within the range R3, and outputs it to the steering control apparatus 30 (refer to steps S13 and S15 in FIG. 4). The number of registered relative positions contained in the range R1 is smaller than the range R3, and therefore the measurement time T1 measured in the running state 1 is shorter than the measurement time T2 measured in the running state 2 in consideration of the fact that the relative position is basically stored in the storage portion 13 per calculation cycle Ts. On the other hand, in a case where the same number of registered relative positions is contained in each of the range R1 and the range R3, the measurement time T1 has an equal or similar value to the measurement time T2. Therefore, if the measurement time T1 is shorter than the measurement time T, it can be confirmed that the adaptive cruise control by the driving assist control apparatus 10 is in operation.

Next, advantageous effects of the adaptive cruise control by the driving assist control apparatus 10 will be described, separately focusing on those in the case of the control on the straight road and those in the case of the control at the time of a lane change.

Figure 7A:
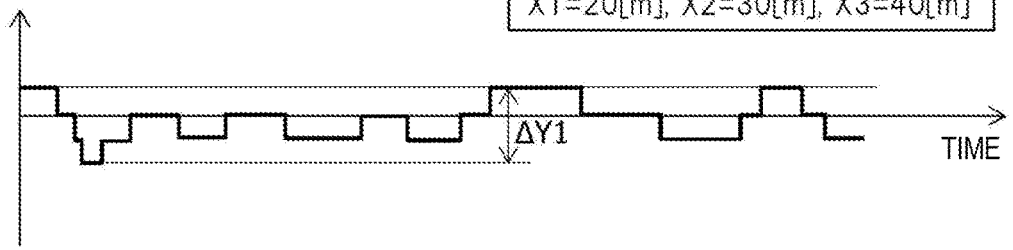
FIGS. 7A and 7B are timing charts illustrating advantageous effects brought about by the adaptive cruise control.
Figure 7B:
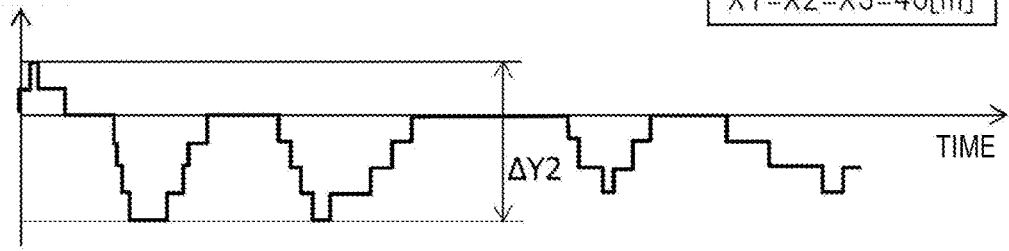

FIGS. 7(A) and 7(b) illustrate advantageous effects of the adaptive cruise control by the driving assist control apparatus 10 in the case of causing the subject vehicle 1 to follow the preceding vehicle running at 80 [km] per hour on the straight road. FIG. 7(a) illustrates a change in the lateral position of the preceding vehicle over time that is detected by the calculation portion 11 when the predetermined values X1, X2, and X3 illustrated in FIG. 4 are set to X1=20 [m], X2=30 [m], and X3=40 [m], respectively, in the adaptive cruise control by the driving assist control apparatus 10. As clearly seen from FIG. 7(a), the maximum change range of the lateral position of the preceding vehicle is confirmed to be ΔY1. On the other hand, FIG. 7(b) illustrates the range of a change in the lateral position of the preceding vehicle over time that is detected by the calculation portion 11 when all the predetermined values X1, X2, and X3 illustrated in FIG. 4 are set to 40 [m] like the conventional technique. As clearly seen from FIG. 7(b), the maximum change range of the lateral position is confirmed to be ΔY2 and be larger than ΔY1. According thereto, in the adaptive cruise control by the driving assist control apparatus 10, the subject vehicle 1 can follow the preceding vehicle on the straight road with more improved stability by setting X1=20 [m], X2=30 [m], and X3=40 [m] than by setting all the predetermined values X1, X2, and X3 to 40 [m].

Figure 8A:
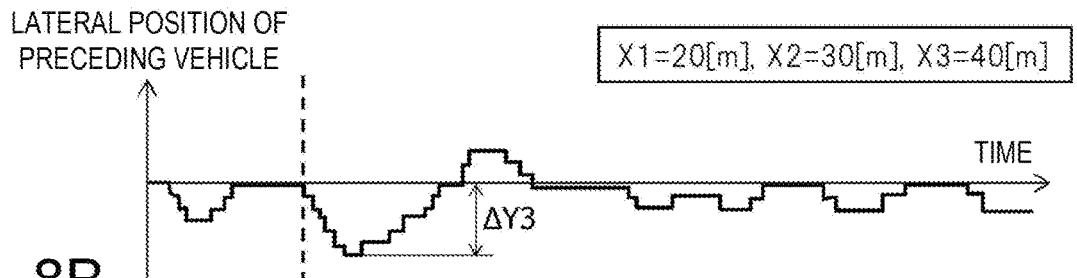
FIGS. 8A to 8D are timing charts illustrating advantageous effects brought about by the adaptive cruise control.
Figure 8B:
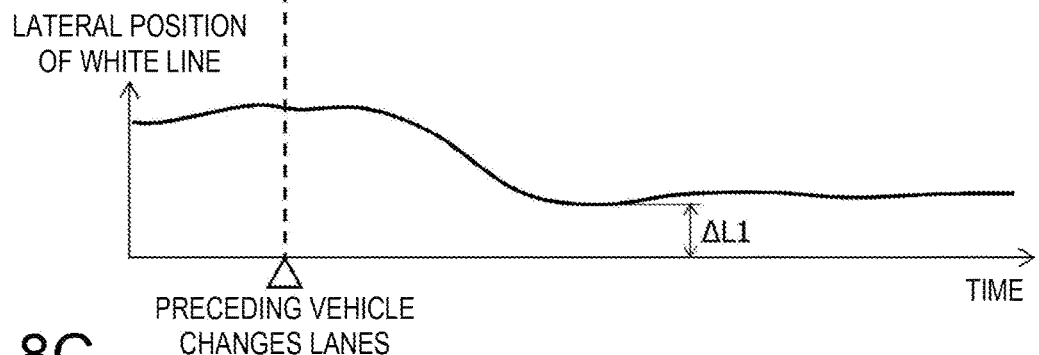
Figure 8C:
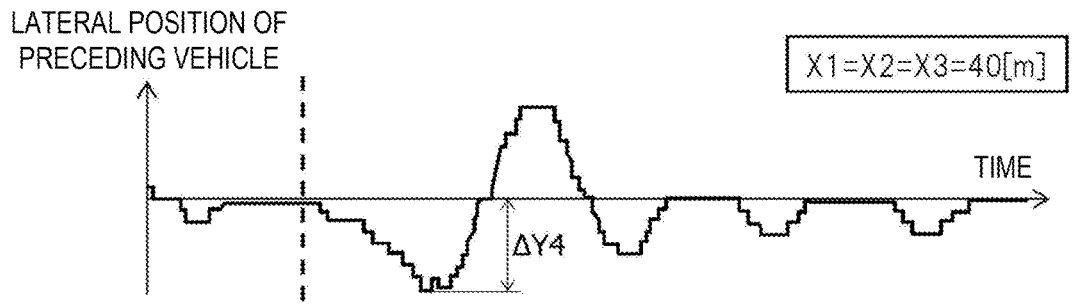
Figure 8D:
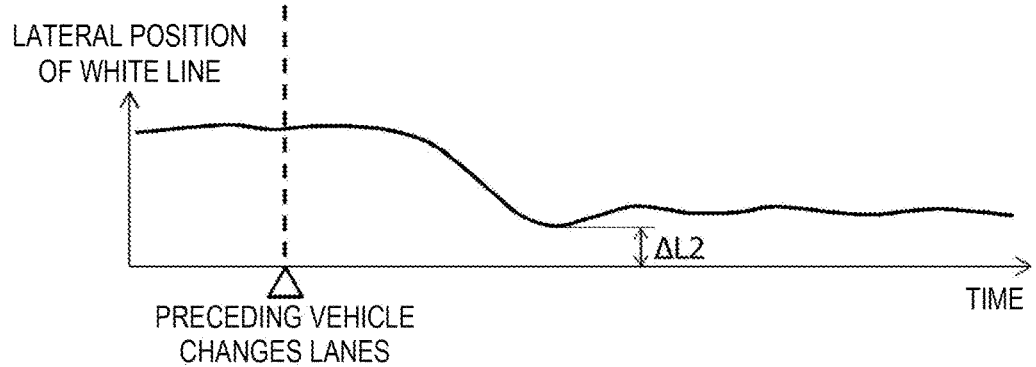

FIGS. 8(a) to 8(d) illustrate advantageous effects of the adaptive cruise control by the driving assist control apparatus 10 in a case where the subject vehicle 1 is controlled to follow the preceding vehicle when the preceding vehicle changes lanes while running at 80 [km] per hour on a straight road having two lanes each way. FIGS. 8(a) and 8(c) illustrate changes in the lateral position of the preceding vehicle over time that are detected by the calculation portion 11, and FIGS. 8(b) and 8(d) illustrate changes over time in the lateral position of the subject vehicle 1 from the outer line of the traffic lane (the lateral position of the white line) that are detected by RTK (Real time Kinematic) measurement.

In FIGS. 8(a) and 8(b), the predetermined values X1, X2, and X3 illustrated in FIG. 4 are set to X1=20 [m], X2=30 [m], and X3=40 [m], respectively, in the adaptive cruise control by the driving assist control apparatus 10. As clearly seen from FIG. 8(a), the response of the adaptive cruise control is delayed when the preceding vehicle changes lanes, and this response delay increases the deviation amount between the lateral positions of the preceding vehicle and the subject vehicle 1 to up to ΔY3. Further, as clearly seen from FIG. 8(b), when the subject vehicle 1 changes lanes by following the preceding vehicle, an overshoot occurs with the subject vehicle 1 overshooting in the opposite direction from when the lateral position of the preceding vehicle is ΔY3. This overshoot causes the subject vehicle 1 to move closer to the outer line of the traffic lane and causes the lateral position of the subject vehicle 1 from the outer line of the traffic lane to reduce to ΔL1 when being minimized.

On the other hand, in FIGS. 8(c) and 8(d), all the predetermined values X1, X2, and X3 illustrated in FIG. 4 are set to 40 [m] in the adaptive cruise control by the driving assist control apparatus 10, like the conventional technique. As clearly seen from FIG. 8(c), the response of the adaptive cruise control is delayed when the preceding vehicle changes lanes, and this response delay increases the deviation amount between the lateral positions of the preceding vehicle and the subject vehicle 1 to up to ΔY4. However, because the response delay increases compared to when the predetermined values X1, X2, and X3 are set to X1=20 [m], X2=30 [m], and X3=40 [m], the deviation amount between the lateral positions of the preceding vehicle and the subject vehicle 1 increases to ΔY4, which is greater than ΔY3. Further, as clearly seen from FIG. 8(d), when the subject vehicle 1 changes lanes by following the preceding vehicle, an overshoot occurs with the subject vehicle 1 overshooting in the opposite direction from when the lateral position of the preceding vehicle is ΔY4. However, because the convergence of the lateral position reduces compared to when the predetermined values X1, X2, and X3 are set to X1=20 [m], X2=30 [m], and X3=40 [m], the lateral position of the subject vehicle 1 from the outer line of the traffic lane reduces to ΔL2 smaller than ΔL1, which means that the subject vehicle 1 unintentionally further approaches the outer line of the traffic lane.

According to the driving assist control apparatus 10 configured in this manner, the range of registered relative positions in the relative position history to which the least square method is applied is divided into the ranges R1, R2, and R3 satisfying the relationship R1<R2<R3, and the approximation equation of the quadratic function is calculated individually for each range. More specifically, the approximation equation for determining the curvature component is calculated from the registered relative positions in the range R1, the approximation equation for determining the yaw angle component is calculated from the registered relative positions in the range R2, and the approximation equation for determining the lateral position component is calculated from the registered relative positions in the range R3. This method facilitates reflecting the information about the lateral position, the yaw angle, and the curvature in the actual movement trajectory of the preceding vehicle on the approximated curve of the approximation equation calculated for each range, thereby being able to improve the compatibility between the accuracy and the responsiveness for the estimation of the movement trajectory.

Next, an exemplary modification of the processing for calculating the control parameter relating to the target steering angle will be described. Descriptions of similar configurations to the above-described embodiment will be omitted or simplified by adding the same reference numerals thereto.

In the above-described calculation processing, the predetermined values X1, X2, and X3, which are the threshold values defining the ranges R1, R2, and R3 of registered relative positions to which the least square method is applied when the approximation equations of the quadratic functions are calculated to determine the three control parameters, respectively, are fixed values having the relationship X1<X2<X3 among them. Therefore, the number of registered relative positions contained in each of the ranges is fixed, and the difference in the number of registered relative positions among the individual ranges is also fixed. On the other hand, the present exemplary modification allows the difference in the number of registered relative positions among the individual ranges to increase or reduce according to the vehicle speed V of the subject vehicle 1, thereby improving the accuracy of the three control parameters.

Figure 9A:
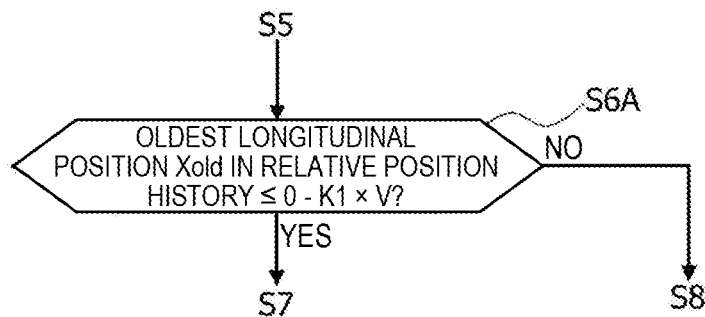
FIGS. 9A to 9C are flowcharts illustrating an exemplary modification of the calculation processing.
Figure 9B:
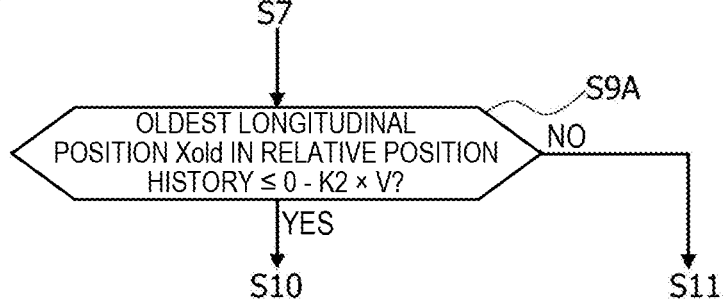
Figure 9C:
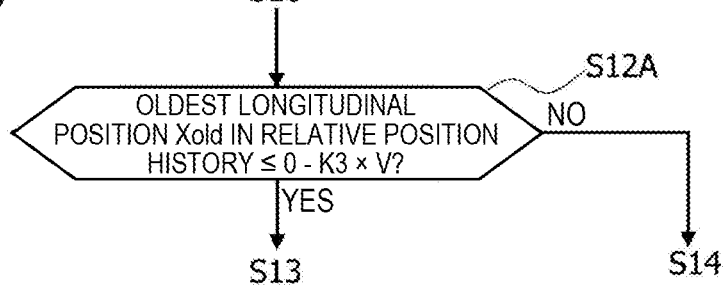

FIGS. 9(a) to 9(c) illustrate how the present exemplary modification is changed from the processing for calculating the control parameter relating to the target steering angle according to the above-described embodiment (refer to FIG. 4). These changes lie in performing step S6A in place of step S6 as illustrated in FIG. 9(a), performing step S9A in place of step S9 as illustrated in FIG. 9(b), and performing step S12A in place of step S12 as illustrated in FIG. 9(c).

In step S6A, the calculation portion 11 determines whether the longitudinal position Xold of the oldest registered relative position in the relative position history satisfies a relational expression Xold≤0−K1×V. In this relational expression, K1 is a preset positive value. The range R1 of registered relative positions, to which the least square method is applied at the time of the calculation of the approximation equation of the quadratic function for determining the control parameter of the curvature component, expands as the vehicle speed V of the subject vehicle 1 increases.

In step S9A, the calculation portion 11 determines whether the longitudinal position Xold of the oldest registered relative position in the relative position history satisfies a relational expression Xold≤0−K2×V. In this relational expression, K2 is a preset positive value, and is a value larger than K1. The range R2 of registered relative positions, to which the least square method is applied at the time of the calculation of the approximation equation of the quadratic function for determining the control parameter of the yaw angle component, is wider than the range R1 and expands as the vehicle speed V of the subject vehicle 1 increases, and the degree of this expansion is greater than the range R1.

In step S12A, the calculation portion 11 determines whether the longitudinal position Xold of the oldest registered relative position in the relative position history satisfies a relational expression Xold≤0−K3×V. In this relational expression, K3 is a preset positive value, and is a value larger than K2. The range R3 of registered relative positions, to which the least square method is applied at the time of the calculation of the approximation equation of the quadratic function for determining the control parameter of the lateral position component, is wider than the range R2 and expands as the vehicle speed V of the subject vehicle 1 increases, and the degree of this expansion is greater than the range R2.

According to the present exemplary modification, the difference in the number of registered relative positions among the individual ranges can increase/reduce according to the vehicle speed V, and therefore the accuracy of the three control parameters can be improved.

Having described the contents of the present invention specifically with reference to the preferred embodiment thereof, it is apparent to those skilled in the art that the present invention can be embodied by various modifications based on the basic technical idea and teaching of the present invention.

According to the above-described embodiment, the range of registered relative positions in the relative position history to which the least square method is applied is divided into the ranges R1, R2, and R3 satisfying the relationship R1<R2<R3, and the approximation equation of the quadratic function is calculated individually for each range. Instead thereof, the ranges R1, R2, and R3 may be set so as to satisfy a relationship R1=R2<R3 or R1<R2=R3. Even setting the ranges R1, R2, and R3 in this manner can improve the compatibility between the accuracy and the responsiveness for the estimation of the movement trajectory compared to the conventional technique that sets the ranges R1, R2, and R3 so as to satisfy the relational expression R1=R2=R3.

Therefore, this concept can be restated in the following manner when being broadened to the estimation of the movement trajectory of the preceding vehicle with use of the approximation equation of the N-th degree function (N is an integer equal to or greater than 1). That is, when a relatively high-degree coefficient is calculated, the range of registered relative positions in the relative position history to which the least square method is applied is set to the same range or a narrower range compared to when a relatively low-degree coefficient is calculated. However, at least when the highest-degree coefficient is calculated, the range of registered relative positions in the relative position history to which the least square method is applied is set to a narrower range compared to when the lowest-degree coefficient is calculated.

In the above-described embodiment, the execution of the adaptive cruise control by the driving assist control apparatus 10 (the calculation processing illustrated in FIGS. 3 and 4) is triggered by the operation of turning on the ignition switch. Instead thereof, the start of the execution of the adaptive cruise control may be triggered when lane-keeping control is determined to be impossible. The lane-keeping control is control of recognizing the lane marking of the road lying ahead of the subject vehicle 1 as the traffic lane in which the subject vehicle 1 is running by the external world recognition apparatus 20 and causing the subject vehicle 1 to follow this traffic lane in which the subject vehicle 1 is running, and the driving assist control apparatus 10 can perform it in a similar manner to the adaptive cruise control. Conversely, when determining that the lane-keeping control can be performed, the driving assist control apparatus 10 ends the adaptive cruise control and shifts to the lane-keeping control. When the driving assist control apparatus 10 determines that both the lane-keeping control and the adaptive cruise control cannot be performed, the steering control apparatus 30 controls the assist torque to be generated by the motor (not illustrated) that drives the electric power steering PS to assist the steering operation performed by the driver.

The yaw rate γ used when the rotational change amount Δθ of the subject vehicle 1 is calculated in the above-described step, step S1 is based on the detection value detected by the yaw rate sensor 50. However, in a case where the yaw rate sensor 50 is connected to the driving assist control apparatus 10 via an in-vehicle CAN (Controller Area Network), the yaw rate received by the driving assist control apparatus 10 may reduce in resolution and accuracy compared to the value used inside the VDC (Vehicle Dynamic Control). To address this inconvenience, the driving assist control apparatus 10 may estimate the yaw rate at the calculation portion 11 based on the vehicle speed V and the steering angle indicating the rotational amount of the steering wheel while using the stability factor, which is a known constant indicating the chassis characteristic regarding understeer and oversteer. In this case, a steering angle sensor that detects the steering angle is connected to the driving assist control apparatus 10, and the steering angle sensor outputs a signal corresponding to the steering angle to the driving assist control apparatus 10.

The movement trajectory of the preceding vehicle is estimated by calculating the approximation equation of the quadratic function, but is not limited thereto and can be estimated with use of an approximation equation of a linear function or an approximation equation of a cubic or higher-degree function. For example, in the case of the approximation equation of the linear function, the information about the yaw angle and the lateral position in the actual movement trajectory is reflected on the approximated curve indicated thereby. In sum, the movement trajectory of the preceding vehicle can be estimated by calculating the approximation equation of the N-th degree function (N is an integer equal to or greater than 1) as described above.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2018-17582 filed on Feb. 2, 2018. The entire disclosure of Japanese Patent Application No. 2018-17582 filed on Feb. 2, 2018 including the specification, the claims, the drawings, and the abstract is incorporated herein by reference in its entirety.

REFERENCE SIGNS LIST 1 subject vehicle
10 driving assist control apparatus
11 calculation portion
12 input/output portion
13 storage portion
20 external world recognition apparatus
21 stereo camera
22 image processing device
30 steering control apparatus
40 vehicle speed sensor
50 yaw rate sensor
X longitudinal position
Y lateral position
X(N), Y(N) registered relative position
R1, R2, R3 range of registered relative positions
A1, A2, A3 quadric coefficient
B1, B2, B3 linear coefficient
C1, C2, C3 free term

The invention claimed is:

1. A vehicle control apparatus comprising:
an input/output portion configured to receive a plurality of pieces of relative position information acquired at different timings by an external world recognition apparatus and each indicating a position of a preceding vehicle relative to a subject vehicle, the preceding vehicle being a target that the subject vehicle follows ahead thereof;
a storage portion configured to store the received plurality of pieces of relative position information; and
a calculation portion configured to calculate an approximation equation of an N-th degree function as a movement trajectory of the preceding vehicle from at least two pieces of relative position information in each of a plurality of retrospective ranges set as ranges to which the vehicle control apparatus date back from newest relative position information in a history of the stored plurality of pieces of relative position information, and calculates a coefficient of a predetermined degree in each approximation equation, wherein N is an integer equal to or greater than one in this case, and in the calculation of the coefficient of the predetermined degree, use an approximation equation calculated from the at least two pieces of relative position information acquired when setting the retrospective range to same range as when calculating a coefficient of a relatively low degree or a narrower range compared to when calculating a coefficient of a relatively low degree, when calculating a coefficient of a relatively high degree, use an approximation equation calculated from the at least two pieces of relative position information acquired when setting the retrospective range to a narrower range compared to when calculating a coefficient of a lowest degree, at least when calculating a coefficient of a highest degree, and
output an instruction according to the calculated coefficient of each degree to a steering control apparatus of the subject vehicle,
wherein the vehicle control apparatus is configured to perform adaptive cruise control according to the instruction such that the subject vehicle runs while following the preceding vehicle running ahead thereof based on a vehicle speed, a yaw rate of the subject vehicle, and the relative position information.

2. The vehicle control apparatus according to claim 1, wherein the retrospective range when the coefficient of the relatively high degree is calculated is set so as to be narrower compared to the retrospective range when the coefficient of the relatively low degree is calculated.

3. The vehicle control apparatus according to claim 2, wherein the N-th function is a quadratic function.

4. The vehicle control apparatus according to claim 2, wherein, as a speed of the subject vehicle increases, a difference increases between the retrospective range when the coefficient of the relatively high degree is calculated, and the retrospective range when the coefficient of the relatively low degree is calculated.

5. A vehicle control method comprising:
receiving a plurality of pieces of relative position information acquired at different timings by an external world recognition apparatus and each indicating a position of a preceding vehicle relative to a subject vehicle, the preceding vehicle being a target that the subject vehicle follows ahead thereof;
storing the received plurality of pieces of relative position information;
calculating an approximation equation of an N-th degree function as a movement trajectory of the preceding vehicle from at least two pieces of relative position information in each of a plurality of retrospective ranges set as ranges to which the vehicle control apparatus date back from newest relative position information in a history of the stored plurality of pieces of relative position information, and calculating a coefficient of a predetermined degree in each approximation equation, wherein N is an integer equal to or greater than one in this case,
the calculating the coefficient of the predetermined degree including:
using an approximation equation calculated from the at least two pieces of relative position information acquired when setting the retrospective range to same range as when calculating a coefficient of a relatively low degree or a narrower range compared to when calculating a coefficient of a relatively low degree, when calculating a coefficient of a relatively high degree, and
using an approximation equation calculated from the at least two pieces of relative position information acquired when setting the retrospective range to a narrower range compared to when calculating a coefficient of a lowest degree, at least when calculating a coefficient of a highest degree; and
outputting an instruction according to the calculated coefficient of each degree to a steering control apparatus of the subject vehicle, wherein adaptive cruise control is performed according to the instruction such that the subject vehicle runs while following the preceding vehicle running ahead thereof based on a vehicle speed, a yaw rate of the subject vehicle, and the relative position information.

6. A vehicle control system comprising:

an external world recognition portion configured to acquire relative position information indicating a position of a preceding vehicle relative to a subject vehicle, the preceding vehicle being a target that the subject vehicle follows ahead thereof;

a storage portion configured to receive a plurality of pieces of relative position information acquired at different timings by the external world recognition portion and store the received plurality of pieces of relative position information; and a calculation portion configured to calculate an approximation equation of an N-th degree function as a movement trajectory of the preceding vehicle from at least two pieces of relative position information in each of a plurality of retrospective ranges set as ranges to which the vehicle control apparatus date back from newest relative position information in a history of the plurality of pieces of relative position information stored by the storage portion, and calculate a coefficient of a predetermined degree in each approximation equation, wherein N is an integer equal to or greater than one in this case, wherein, in the calculation of the coefficient of the predetermined degree, the calculation portion:

uses an approximation equation calculated from the at least two pieces of relative position information acquired when the retrospective range is set to same range as when calculating a coefficient of a relatively low degree or a narrower range compared to when calculating a coefficient of a relatively low degree, when calculating a coefficient of a relatively high degree, and uses an approximation equation calculated from the at least two pieces of relative position information acquired when the retrospective range is set to a narrower range compared to when calculating a coefficient of a lowest degree, at least when calculating a coefficient of a highest degree, and wherein the vehicle control system further includes an output portion configured to provide an output to a steering control apparatus of the subject vehicle upon receiving an instruction according to the calculated coefficient of each degree, wherein the vehicle control system is configured to perform adaptive cruise control according to the instruction such that the subject vehicle runs while following the preceding vehicle running ahead thereof based on vehicle speed, yaw rate, and the relative position information.

* * * * *